United States Patent
Peridon

(10) Patent No.: US 7,011,316 B1
(45) Date of Patent: Mar. 14, 2006

(54) INFANT CAR SEAT STROLLER

(76) Inventor: Marlyn Peridon, 2407 Melrose Ave., Bossier City, LA (US) 71111

( * ) Notice: Subject to any disclaimer, the term of this patent is extended or adjusted under 35 U.S.C. 154(b) by 7 days.

(21) Appl. No.: 10/885,281

(22) Filed: Jul. 6, 2004

(51) Int. Cl.
B62B 9/12 (2006.01)

(52) U.S. Cl. .................. 280/30; 280/643; 280/642; 280/647

(58) Field of Classification Search .............. 280/30, 280/643, 641, 642, 644, 647
See application file for complete search history.

(56) References Cited

U.S. PATENT DOCUMENTS

| 2,401,486 | A |   | 6/1946 | Talbott | 280/41 |
|---|---|---|---|---|---|
| 3,550,997 | A |   | 12/1970 | Strand | 280/30 |
| 3,984,115 | A |   | 10/1976 | Miller | 280/642 |
| 4,157,837 | A |   | 6/1979 | Kao | 280/30 |
| 4,620,711 | A | * | 11/1986 | Dick | 280/30 |
| 4,747,526 | A |   | 5/1988 | Launes | 224/155 |
| 4,762,331 | A | * | 8/1988 | Tucker et al. | 280/30 |
| 4,768,795 | A | * | 9/1988 | Mar | 280/30 |
| 4,915,401 | A | * | 4/1990 | Severson et al. | 280/30 |
| 4,921,261 | A | * | 5/1990 | Sadler et al. | 280/30 |
| 5,121,940 | A | * | 6/1992 | March | 280/644 |
| 5,133,567 | A | * | 7/1992 | Owens | 280/30 |
| 5,203,577 | A | * | 4/1993 | Kato et al. | 280/30 |
| 5,213,360 | A | * | 5/1993 | Lin | 280/648 |
| 5,301,963 | A | * | 4/1994 | Chen | 280/30 |
| 5,499,831 | A | * | 3/1996 | Worth et al. | 280/30 |
| 5,707,106 | A | * | 1/1998 | Clark | 297/130 |
| 5,829,826 | A | * | 11/1998 | Ziccardi | 297/118 |
| 5,865,447 | A | * | 2/1999 | Huang | 280/30 |
| 6,209,892 | B1 | * | 4/2001 | Schaaf et al. | 280/33.993 |
| 6,241,274 | B1 | * | 6/2001 | Huang | 280/642 |
| 6,273,438 | B1 | * | 8/2001 | Prapavat | 280/47.21 |
| 6,302,412 | B1 | * | 10/2001 | Worth et al. | 280/30 |
| 6,398,233 | B1 | * | 6/2002 | Liang et al. | 280/30 |
| 6,641,164 | B1 | * | 11/2003 | Wood et al. | 280/648 |
| 6,695,400 | B1 | * | 2/2004 | Washizuka et al. | 297/130 |
| 6,702,316 | B1 | * | 3/2004 | Hsia | 280/648 |
| 2002/0093177 | A1 | * | 7/2002 | Chen | 280/647 |
| 2004/0124611 | A1 | * | 7/2004 | Gong et al. | 280/642 |

* cited by examiner

Primary Examiner—J. Allen Shriver
(74) Attorney, Agent, or Firm—R. Keith Harrison

(57) ABSTRACT

An infant car seat stroller for transporting an infant car seat is disclosed. The infant car seat stroller includes a stroller frame for supporting an infant car seat, a pair of frame wheels provided on the stroller frame and a rear wheel frame having a rear wheel provided on the stroller frame for supporting the stroller frame in a reclined position on a surface.

16 Claims, 4 Drawing Sheets

INFANT CAR SEAT STROLLER

FIELD OF THE INVENTION

The present invention relates to car seats for holding and securing infants in a car. More particularly, the present invention relates to an infant car seat stroller to which an infant car seat can be removably attached for the transport of an infant.

BACKGROUND OF THE INVENTION

Infant car seats are commonly used to secure an infant in a vehicle during travel. A typical infant car seat includes a base which is secured in the vehicle and a car seat which is removably mounted in the base. During transport in the vehicle, the car seat is secured in the base and the infant is transported in the car seat. When the infant is not being transported in the vehicle, the car seat can be removed from the base and hand-carried with the infant strapped therein, as desired. However, since the car seat often adds considerable weight to the infant, it is often cumbersome for one person to carry. Therefore, an infant car seat stroller is needed for transporting an infant car seat with an infant held therein.

SUMMARY OF THE INVENTION

The present invention is generally directed to an infant car seat stroller which is suitable for transporting an infant in an infant car seat outside a vehicle. The infant car seat stroller includes a wheeled frame to which an infant car seat can be removably attached. An infant can be placed in the car seat and transported therein. A safety net may be removably attached to the back of the frame. When the infant becomes a toddler, the safety net can be replaced by a retainer panel. Cross straps attached to the frame include a pair of upper strap segments which removably engage a pair of lower strap segments, respectively, to retain the toddler against the retainer panel during transport of the stroller. The stroller may further include a rear wheel mounted on a rear wheel frame which can be selectively pivoted from the stroller frame to support the stroller in a reclined position. A folding bottom frame member may be provided on the stroller frame to support the stroller frame in an upright position, as desired.

BRIEF DESCRIPTION OF THE DRAWINGS

The invention will now be described, by way of example, with reference to the accompanying drawings, in which.

DETAILED DESCRIPTION OF THE INVENTION

Figure 6:
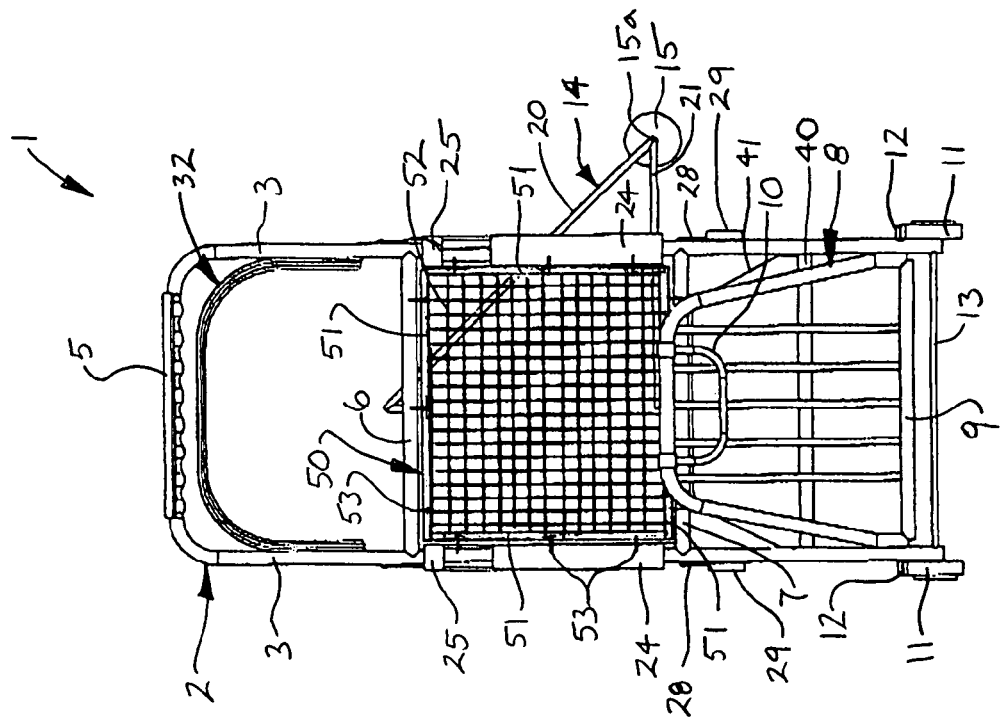
FIG. 6 is a front view of the folded infant car seat stroller shown in FIG. 5.

Referring to the drawings, an illustrative embodiment of the infant car seat stroller, hereinafter stroller, is generally indicated by reference numeral 1. The stroller 1 includes a stroller frame 2 having a pair of elongated side frame members 3 which are connected by an upper frame member 4. A handle 5 of selected design can be provided on the upper frame member 4. Preferably, the handle 5 is a padded handle. As illustrated in FIG. 6, an upper seat attachment bar 6 and a lower seat attachment bar 7 extend between the side frame members 3, in spaced-apart relationship with respect to each other. A frame mount bar 9 spans the side frame members 3 beneath the lower seat attachment bar 7, and a bottom frame member 8 is pivotally attached to the frame mount bar 9. A support member 10 is hingedly attached to the extending end of the bottom frame member 8. Accordingly, the bottom frame member 8 and support member 10 can be pivoted from the folded "storage" position of FIGS. 5 and 6 to the deployed, functional position of FIGS. 3 and 4 to support the stroller 1 in an upright position on a floor or other surface, as desired.

An elongated wheel axle 13 extends between the side frame members 3, adjacent to the bottom ends thereof A frame wheel 11 is mounted on each end of the wheel axle 13. A press-type wheel lock 12, which may be conventional, is provided on each side frame member 3 to engage and lock each frame wheel 11 upon depression of the wheel lock 12, as desired.

Figure 2:
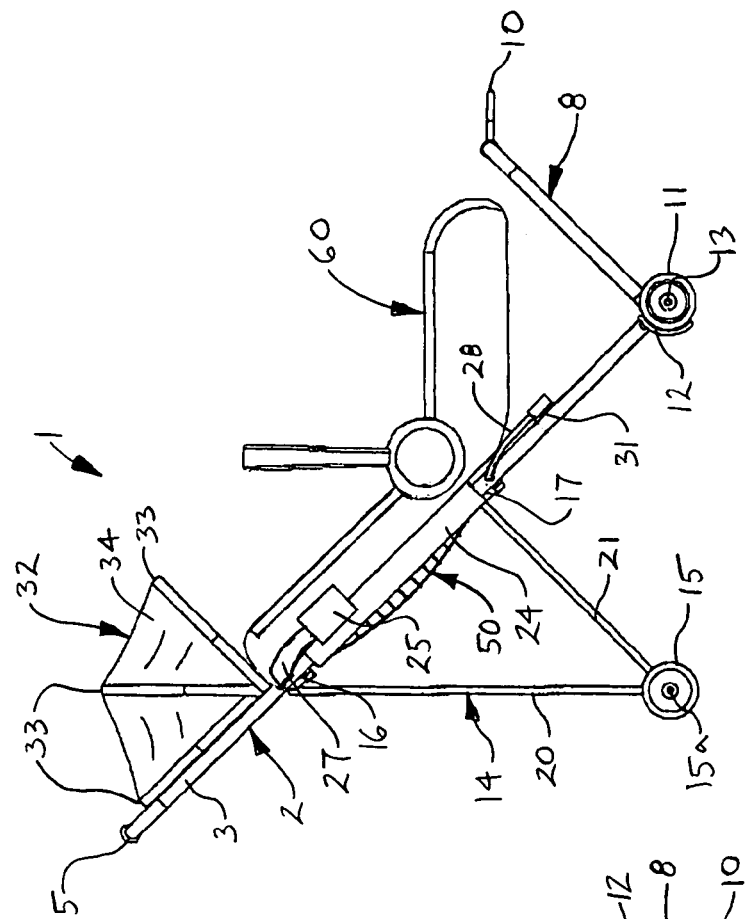
FIG. 2 is a side view of the infant car seat stroller shown in FIG. 1, with the rear wheel frame extended from the stroller frame and the stroller frame resting in a reclined position.
Figure 3:
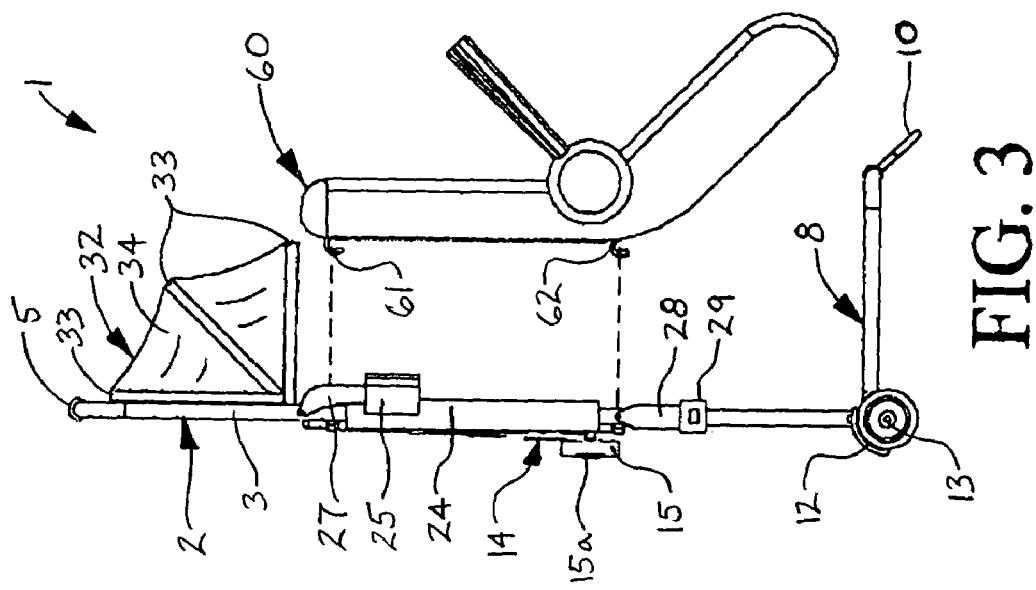
FIG. 3 is a side, partially exploded view of the infant car seat stroller, illustrating removable attachment of an infant car seat to the stroller frame.
Figure 7:
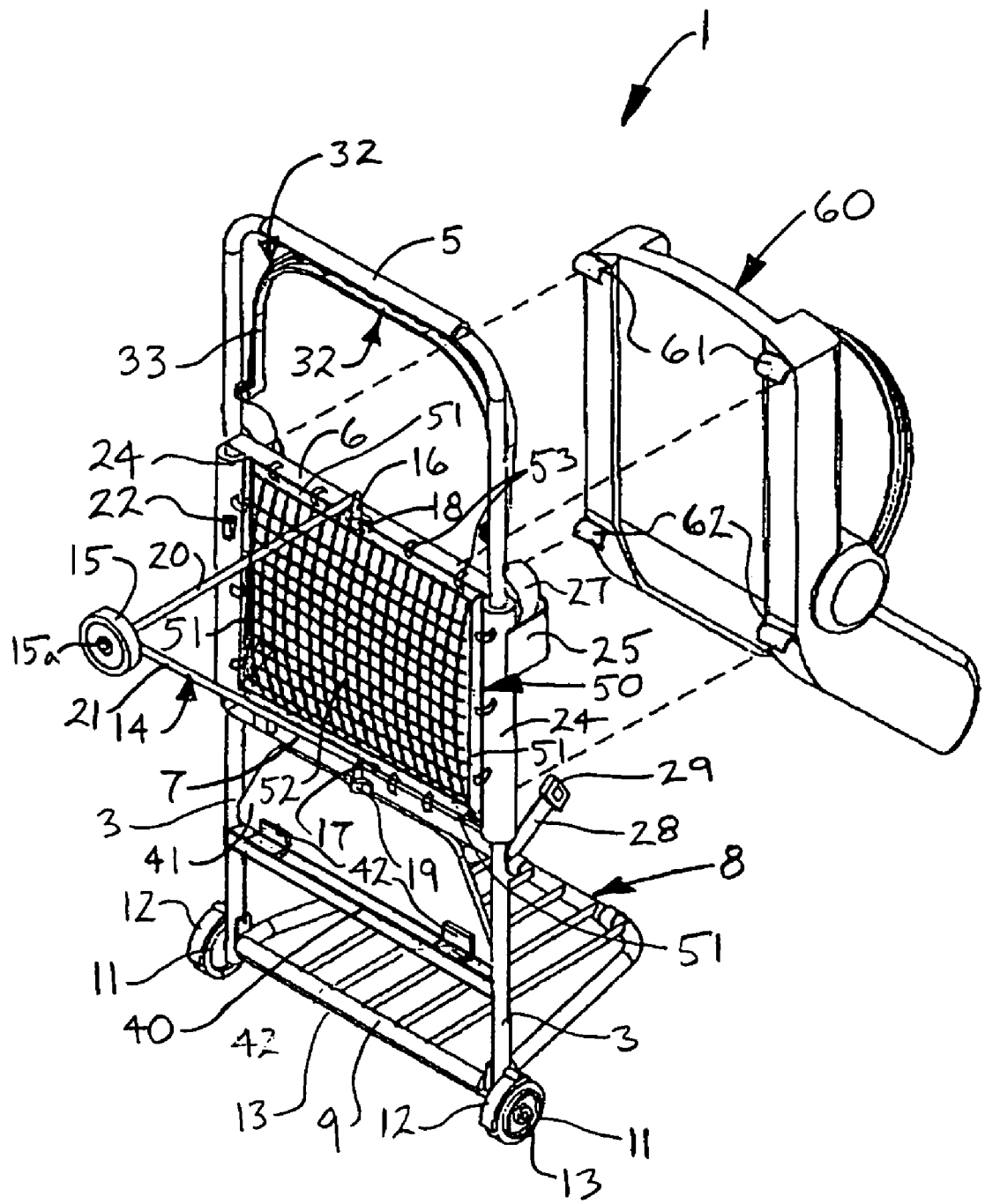
FIG. 7 is an exploded, perspective view of an illustrative embodiment of an infant car seat stroller according to the present invention, illustrating typical attachment of an infant car seat to the infant car seat stroller.

As illustrated in FIG. 7, a rear wheel frame 14, which may be generally triangular in shape, may be pivotally attached to the stroller frame 2. The rear wheel frame 14 typically includes an upper frame member 20 having an upper frame pin 16 and a lower frame member 21 having a lower frame pin 17. A rear wheel axle 15a extends from the rear wheel frame 14, and a rear wheel 15 is rotatably mounted on the rear wheel axle 15a. An upper pin socket 18 is provided on the upper seat attachment bar 6, and a lower pin socket 19 is provided on the lower seat attachment bar 7. Accordingly, the upper frame pin 16 of the upper frame member 20 is rotatably mounted in the upper pin socket 18, whereas the lower frame pin 17 of the lower frame member 21 is rotatably mounted in the lower pin socket 19. Accordingly, the rear wheel frame 14 can be pivoted between the closed, non-functional or "storage" position of FIGS. 5 and 6 and the extended or functionally-deployed position of FIGS. 2 and 7, in which case the stroller 1 can rest on the rear wheel 15 in the reclined position. A lock mechanism (not illustrated), such as a lock pin, for example, may be used to lock the rear wheel frame 14 in the extended or functionally-deployed position of FIGS. 2 and 7. When in the folded, non-functional or "storage" position of FIGS. 5 and 6, the rear wheel frame 14 can be magnetically attached to a frame magnet 22 which is provided on the rear surface of one of the frame pads 24, as illustrated in FIG. 3.

A footrest mount bar 40 extends between the side frame members 3, beneath the lower attachment bar 7. A footrest 41 is attached to the footrest mount bar 40 typically using leaf hinges 42. Accordingly, the footrest 41 can be pivoted between the upper, "storage" position of FIGS. 5 and 6 and the lower, functional position of FIG. 4 for purposes which will be hereinafter described.

Figure 4:
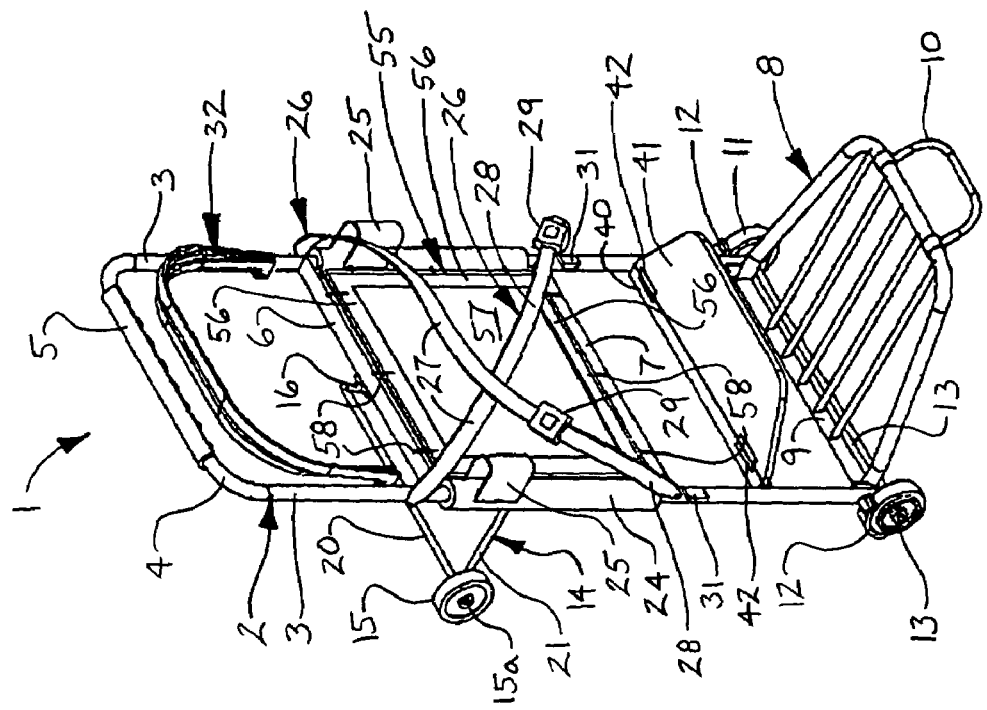
FIG. 4 is a front perspective view of the infant car seat stroller, with the retainer panel provided on the stroller frame in place of the safety net, the cross straps deployed in the toddler-supporting position, and the stroller frame deployed in an upright position.

An elongated, resilient frame pad 24 covers the portion of each side frame member 3 which extends between the upper seat attachment bar 6 and the lower seat attachment bar 7. As illustrated in FIG. 4, a pair of cross straps 26 is provided on the stroller frame 2. Each of the cross straps 26 includes an upper strap segment 27 which is bolted or otherwise attached to the corresponding side frame member 3, above the frame pad 24. A buckle insert (not illustrated) is provided on the extending end of each upper strap segment 27. Each of the cross straps 26 further includes a lower strap segment 28 which is bolted or otherwise attached to the corresponding side frame member 3, beneath the frame pad 24. Each of the lower strap segments 28 is fitted with a buckle 29. Accordingly, as further shown in FIG. 4, the upper strap segments 27 can be removably attached to the lower strap segments 28 by inserting the buckle insert (not illustrated) of each upper strap segment 27 in the buckle 29 of the lower strap segment 28 which is attached to the opposite side of the stroller frame 2, for purposes which will be hereinafter described. A strap pocket 25 is attached to each frame pad 24 or side frame member 3 to hold the corresponding upper strap segment 27 when the cross straps are not in use, as will be hereinafter described. A buckle magnet 31 may be provided on each side frame member 3 to magnetically attract and secure the buckle 29 of the corresponding lower strap segment 28 when the cross straps 26 are not in use.

Figure 1:
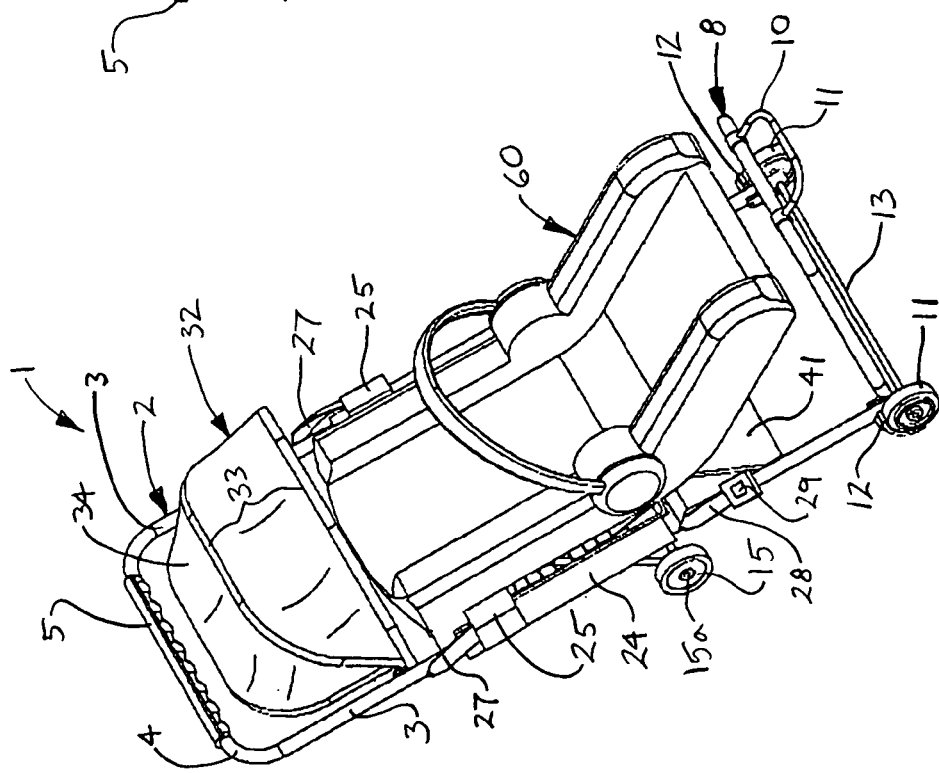
FIG. 1 is a front perspective view of an illustrative embodiment of the infant car seat stroller of the present invention, with an infant car seat removably attached to the stroller and the stroller deployed in a reclined position.
Figure 5:
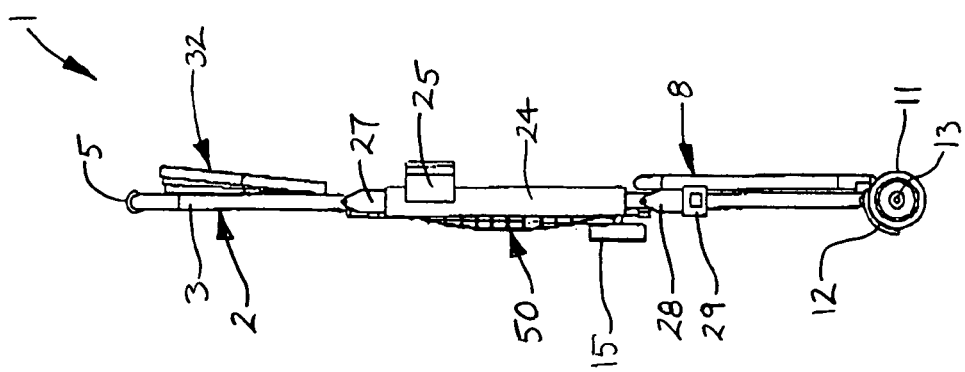
FIG. 5 is a side view of the infant car seat stroller, with the rear wheel frame and bottom frame member deployed in a folded, storage or transport configuration.

A folding hood 32 may be provided on the stroller frame 2. As illustrated in FIG. 7, the hood 32 typically includes a hood frame 33 which is pivotally attached to the respective side frame members 3. A hood canopy 34, which may be cloth or any other suitable flexible material, covers the hood frame 33. Preferably, the flexible material is a waterproof material. Accordingly, the hood 32 may be selectively deployed in an extended, functional configuration as illustrated in FIGS. 1 and 2 or a folded "storage" configuration as illustrated in FIGS. 5 and 6, for purposes which will be hereinafter further described.

As illustrated in FIG. 7, a safety net 50, the purpose of which will be hereinafter described, may be removably attached to the stroller frame 2. The safety net 50 typically includes a net body 52 having flexible reinforcing strips 51 extending around the edges thereof. Multiple releasable attachment rings 53 extend through the reinforcing strips 51 in spaced-apart relationship to each other. The attachment rings 53 are extended through respective ring openings (not shown) provided in the side frame members 3, upper seat attachment bar 6 and lower seat attachment bar 7 to removably secure the safety net 50 to the stroller frame 2. The safety net 50 can be removed from the stroller frame 2 by removing the attachment rings 53 from the respective ring openings.

The safety net 50 can be removed from the stroller frame 2 and replaced with a retainer panel 55, which is illustrated in FIG. 4, for purposes which will be hereinafter described. The retainer panel 55 typically includes a flexible panel sheet 57 having flexible reinforcing strips 56 extending around the edges thereof. Multiple releasable attachment rings 58 extend through the reinforcing strips 56 in spaced-apart relationship to each other. After the safety net 50 has been removed from the stroller frame 2, the retainer panel 55 can be attached to the stroller frame 2 in its place by extending the attachment rings 58 through the ring openings (not illustrated) provided in the side frame members 3, the upper seat attachment bar 6 and the lower seat attachment bar 7.

In use of the stroller 1, an infant car seat 60 is removably attached to the stroller frame 2 and an infant (not illustrated) can be placed in the infant car seat 60 and transported by rolling the stroller 1 on the frame wheels 11 or on both the frame wheels 11 and the rear wheel 15. As illustrated in FIG. 3, a pair of spaced-apart upper attachment hooks 61 and a pair of spaced-apart lower attachment hooks 62 are provided on the rear of the infant car seat 60. Each of the upper attachment hooks 61 and the lower attachment hooks 62 may be mounted to the infant car seat 60 in such a manner that the attachment hooks 61, 62 can be folded from a retracted position (not illustrated) to the extended or functionally-deployed position of FIG. 3 to facilitate removable engagement of the upper attachment hooks 61 to the upper seat attachment bar 6 and the lower attachment hooks 62 to the lower seat attachment bar 7.

When the infant car seat 60 is attached to the upper seat attachment bar 6 and the lower seat attachment bar 7 as illustrated in FIG. 3 and as heretofore described, an infant (not illustrated) can be placed and secured in the infant car seat 60. A user (not illustrated) can then transport the stroller 1 by grasping the handle 5 and pushing the stroller 1 on the frame wheels 11. As illustrated in FIGS. 1 and 2, the stroller 1 can be deployed in a reclined, self-supporting position, as desired, by positioning the rear wheel frame 14 in the extended, functional position and resting the rear wheel 15 on the floor, ground or other supporting surface. Alternatively, the stroller 1 can be deployed in a self-supporting, upright position by deploying the bottom frame member 8 and support member 10 in the extended, functional position of FIG. 4 and resting the support member 10 on the ground, floor or other supporting surface. The safety net 50 provides a safety mechanism for the infant car seat 60 in the event of inadvertent breakage of the upper attachment hooks 61 and/or lower attachment hooks 62 when the stroller 1 is deployed in the reclined position. As illustrated in FIGS. 1 and 2, the hood 32 can be deployed in the extended, functional position to cover the car seat 60 and shade the infant in the car seat 60 from sunlight, for example.

After an infant reaches the toddler stage of maturity, he or she can be transported on the stroller 1 as follows. The safety net 50 is removed from the stroller frame 2 and replaced by the retainer panel 55, as heretofore described. As illustrated in FIG. 4, the footrest 41 is deployed in the lowered, extended or functional position. The upper strap segments 27 of the cross straps 26 are removed from the respective strap pockets 25. As the toddler's feet rest on the footrest 41, each upper strap segment 27 is extended around the toddler, attached to the buckle 29 on the lower strap segment 28 which is provided on the opposite side of the stroller frame 2, and tightened. Accordingly, the toddler is secured between the retainer panel 55 and the cross straps 26 as his or her feet are supported by the footrest 41. The stroller 1 can then be pushed on the frame wheels 11, or on both the frame wheels 11 and rear wheel 15, to transport the toddler. The toddler is released from the stroller 1 by unfastening the upper strap segments 27 from the respective buckles 29.

As illustrated in FIGS. 5 and 6, the stroller 1 can be deployed in a folded, storage position to facilitate storage of the stroller 1 or transport of the stroller 1 in a vehicle, for example. This is accomplished by pivoting the rear wheel frame 14 from the functional, extended position of FIGS. 1 and 2 to the folded, storage position of FIG. 7, wherein the rear wheel frame 14 is magnetically attached to the frame magnet 22; positioning the footrest 41 in the upwardly-pivoted or folded position of FIGS. 5 and 6; pivoting the support member 10 downwardly to rest against the bottom surface of the bottom frame member 8; and pivoting the bottom frame member 8 upwardly, toward the stroller frame 2.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, I claim:

1. An infant car seat stroller comprising:
   a stroller frame for supporting an infant car seat;
   a pair of frame wheels provided on said stroller frame;
   a rear wheel frame having a rear wheel provided on said stroller frame for supporting said stroller frame in a reclined position on a surface; and
   a safety net and a flexible retainer panel having a panel sheet and a reinforcing strip carried by said panel sheet interchangeably carried by said stroller frame in place of each other.

2. The infant car seat stroller of claim 1 further comprising a hood provided on said stroller frame for selectively covering the infant car seat.

3. The infant car seat stroller of claim 2 wherein said hood comprises a folding hood.

4. The infant car seat stroller of claim 1 further comprising a bottom frame member carried by said stroller frame for supporting said stroller frame in an upright position on a surface.

5. The infant car seat stroller of claim 1 further comprising a pair of cross straps carried by said stroller frame.

6. The infant car seat stroller of claim 1 further comprising a footrest hingedly carried by said stroller frame.

7. An infant car seat stroller comprising:
   a stroller frame for supporting an infant car seat;
   a pair of frame wheels provided on said stroller frame;
   a rear wheel frame having a rear wheel provided on said stroller frame for supporting said stroller frame in a reclined position on a surface;
   a bottom frame member carried by said stroller frame for supporting said stroller frame in an upright position on the surface; and
   a safety net and a flexible retainer panel interchangeably carried by said stroller frame in place of each other, each of said safety net and said retainer panel having a plurality of attachment rings for removably engaging said stroller frame.

8. The infant car seat stroller of claim 7 further comprising a hood provided on said stroller frame for selectively covering the infant car seat.

9. The infant car seat stroller of claim 8 wherein said hood comprises a folding hood.

10. The infant car seat stroller of claim 9 further comprising a pair of cross straps carried by said stroller frame.

11. The infant car seat stroller of claim 10 wherein said pair of cross-straps comprises a pair of lower strap segments carried by said stroller frame and a pair of upper strap segments carried by said stroller frame for removably engaging said pair of lower strap segments.

12. The infant car seat stroller of claim 10 further comprising a footrest hingedly carried by said stroller frame.

13. An infant car seat stroller comprising:
   a stroller frame having a pair of side frame members and an upper seat attachment bar and a lower seat attachment bar spanning said pair of side frame members for supporting an infant car seat;
   a pair of frame wheels provided on said stroller frame;
   a rear wheel frame having a rear wheel pivotally carried by said upper seat attachment bar and said lower seat attachment bar of said stroller frame at substantially a midpoint of said upper seat attachment bar and said lower seat attachment bar, said rear wheel frame pivotal between a folded, storage position adjacent to one of said side frame members and an extended position for supporting said stroller frame in a reclined position on a surface; and
   a bottom frame member carried by said stroller frame, said bottom frame member pivotal between a folded, storage position and an extended position for supporting said stroller frame in an upright position on the surface.

14. The infant car seat stroller of claim 13 further comprising a safety net for removable attachment to said stroller frame and a retainer panel for removable attachment to said stroller frame in place of said safety net.

15. The infant car seat stroller of claim 13 further comprising a pair of cross straps carried by said stroller frame.

16. The infant car seat stroller of claim 13 further comprising a footrest hingedly carried by said stroller frame.

* * * * *